(12) United States Patent
Kim

(10) Patent No.: US 6,958,838 B2
(45) Date of Patent: Oct. 25, 2005

(54) LASER SCANNING UNIT

(75) Inventor: Hyung-soo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/772,450

(22) Filed: Feb. 6, 2004

(65) Prior Publication Data

US 2004/0233496 A1 Nov. 25, 2004

(30) Foreign Application Priority Data

May 21, 2003 (KR) ...................... 10-2003-0032254

(51) Int. Cl.[7] ............................................ G02B 26/08

(52) U.S. Cl. ....................... 359/204; 359/205; 359/216

(58) Field of Search ................................ 359/196, 204, 359/205, 216–219, 850, 851; 347/233

(56) References Cited

U.S. PATENT DOCUMENTS 5,963,354 A * 10/1999 Shiraishi et al. ............. 359/204
6,788,444 B2 * 9/2004 Suzuki et al. ................ 359/196

FOREIGN PATENT DOCUMENTS

JP 08-160337 6/1996 .......... G02B 26/10
JP 2000147399 5/2000

* cited by examiner

*Primary Examiner*—Euncha P. Cherry
(74) *Attorney, Agent, or Firm*—Roylance, Abrams, Berdo & Goodman, L.L.P.

(57) ABSTRACT

A laser scanning unit is provided comprising a polygon mirror that deflects light beams respectively emitted by a plurality of light sources, an image focusing system that respectively focuses an image corresponding to each light beam deflected from the polygon mirror onto a surface of a plurality of photoconductive drums, and an incident optical system disposed between the light sources and the polygon mirror. The incident optical system comprises an infinite optical system along a main scanning direction and a finite optical system along a sub-scanning direction.

8 Claims, 3 Drawing Sheets

LASER SCANNING UNIT

PRIORITY

This application claims priority of Korean Patent Application No. 2003-32254, filed on May 21, 2003, in the Korean Intellectual Property Office, the entire contents of which are incorporated herein by reference.

BACKGROUND OF THE INVENTION

1. Field of the Invention

The present invention relates to a laser scanning unit for an image forming device, and more particularly, to a tandem type laser scanning unit that scans a plurality of light sources over one deflecting device and projects images on a plurality of photoconductive drums.

2. Description of the Related Art

In general, a laser scanning unit (LSU) is used in image forming devices such as copiers, printers, or facsimile machines, all of which print images on printing paper. The LSU scans a light beam emitted from a light source, for example, a laser diode, to a photoconductive medium of the image forming device and makes an electrostatic latent image.

Laser scanning units can be described as comprised of two different optical systems, both of which are dependent upon the polygon mirror. The first system is an incident optical system, and the second is an image optical system. The incident optical system comprises the area of the LSU from the light source to the polygon mirror. The image optical system comprise the area of the LSU from the polygon mirror to the photoconductive drum.

The incident optical system includes a light source which emits a light beam, a collimating lens that directly transmits the light beam emitted from the light source, and a polygon mirror that reflects the light beam. The light source can include a plurality of laser semiconductors, the plurality of which emits a plurality of light beams.

A tandem type LSU projects the plurality of light beams emitted from a plurality of light sources onto a plurality of photoconductive drums. The light beams emitted from the light sources are projected onto a polygon mirror with different incidence angles with respect to a main scanning direction and are respectively reflected onto the photoconductive drums. Because of the different incident angles, errors in linearity can occur.

The LSU that solves this problem is disclosed in Japanese Patent Publication No. 2000-147399. the entire contents of which are incorporated herein by reference. This LSU changes proceeding paths of light beams emitted from multiple light sources and projects the beams onto the polygon mirror with the same incidence angles. It is difficult to use the plurality of light sources, however, to project the light beams emitted from each light source onto the polygon mirror with the same incidence angle without a loss of luminous intensity. In addition, changes in focal distances that result from temperature shifts generally affects the optical performance of the LSU.

SUMMARY OF THE INVENTION

The present invention provides a laser scanning unit (LSU) that corrects linearity errors when projecting a plurality of laser light beams onto a polygon mirror, prevents focal distance changes due to a temperature shifts, and maintains optical performance.

According to an embodiment of the present invention, there is provided an LSU comprising at least one light source, a polygon mirror that deflects a plurality of light beams respectively emitted by the plurality of the light sources, an image focusing system that respectively focuses an image corresponding to each light beam deflected from the polygon mirror onto the surface of a plurality of photoconductive drums, and an incident optical system disposed between the light sources and the polygon mirror. The incident optical system comprises an infinite optical system along a main scanning direction and a finite optical system along a sub-scanning direction.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Figure 1:
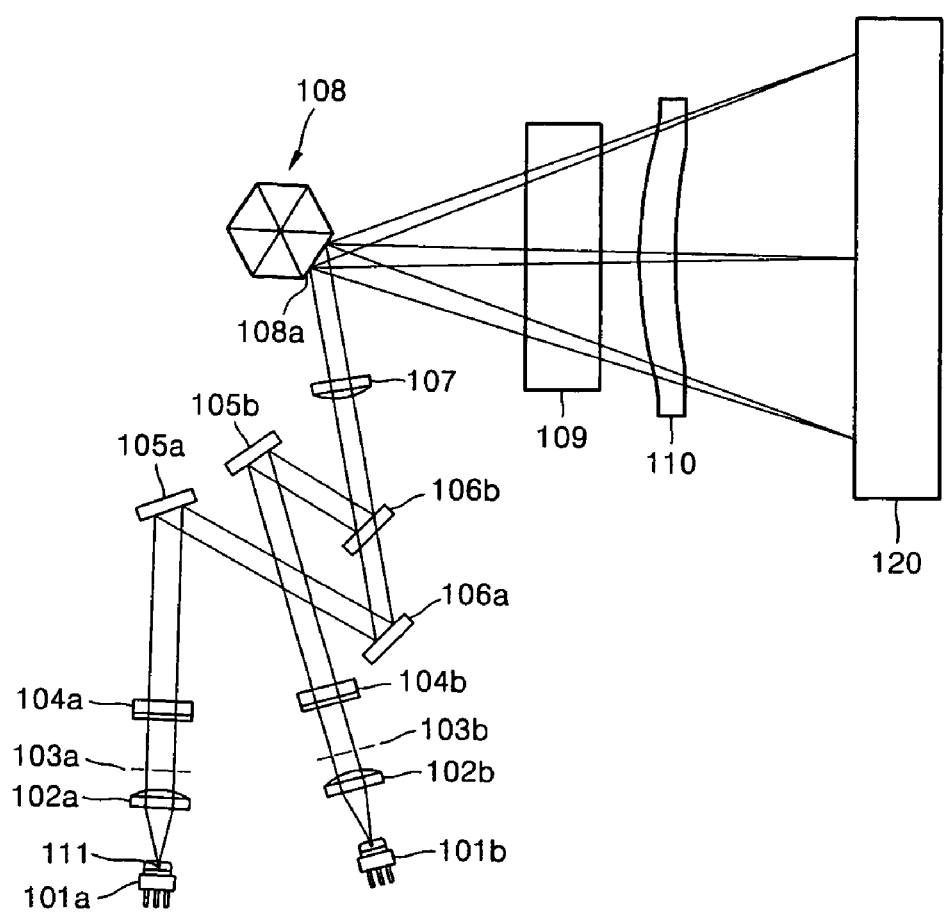
FIG. 1 is a plane view schematically illustrating a structure of a laser scanning unit (LSU) according to an embodiment of the present invention.
Figure 2:
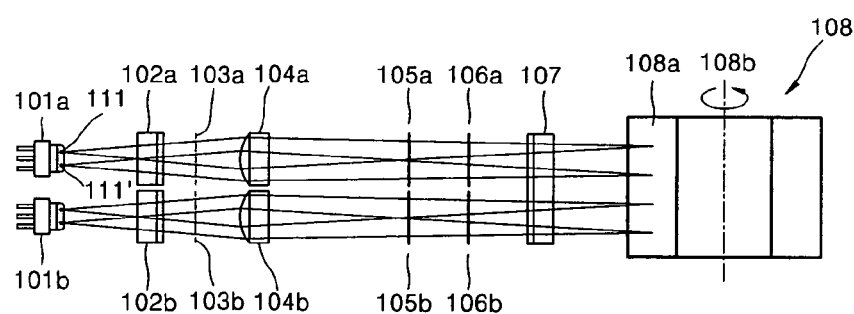
FIG. 2 is a drawing illustrating proceeding paths of light beams from light sources to a polygon mirror with respect to a sub-scanning direction in the LSU of FIG. 1.
Figure 3:
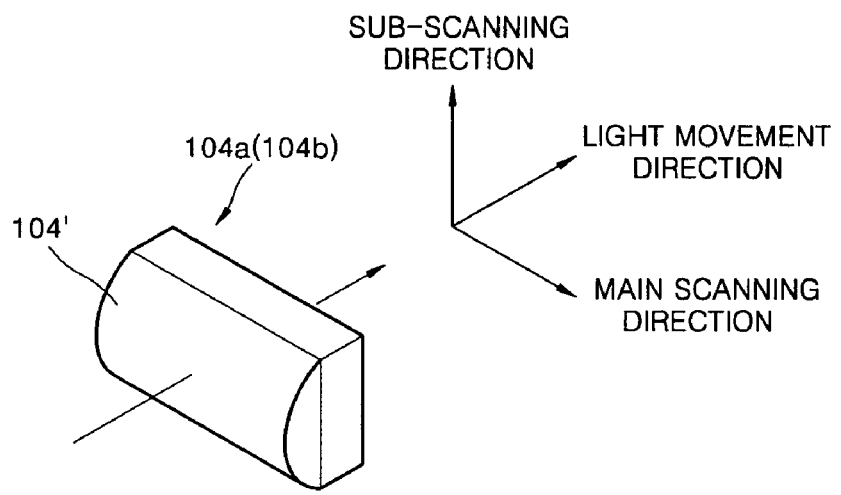
FIG. 3 is a perspective view illustrating a first cylinder lens of FIG. 1.
Figure 4:
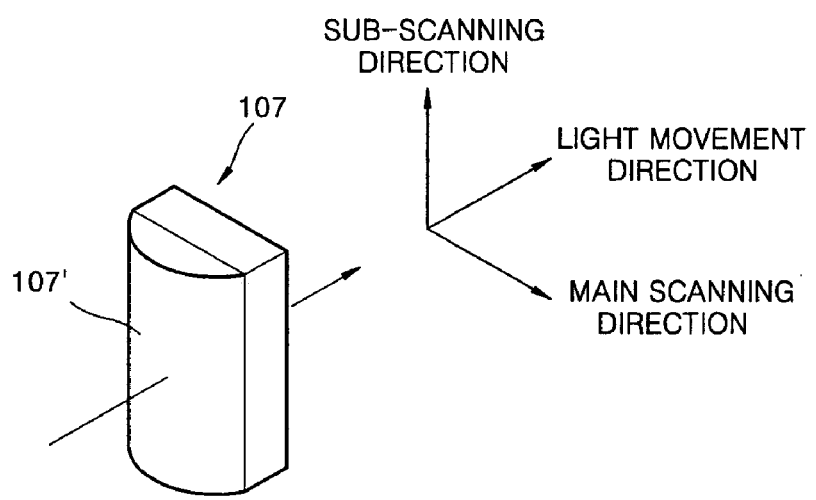
FIG. 4 is a perspective view illustrating a second cylinder lens of in FIG. 1.

FIG. 1 is a plane view schematically illustrating the structure of a laser scanning unit (LSU) according to an embodiment of the present invention. FIG. 2 is a drawing illustrating proceeding sub-scanning directions of light beams from light sources to a polygon mirror in the LSU of FIG. 1. FIG. 3 is a perspective view illustrating a first cylinder lens of FIG. 1. FIG. 4 is a perspective view illustrating a second cylinder lens of FIG. 1. Each light source has at least one light-emitting point.

Referring to FIGS. 1 through 4, the LSU includes a plurality of light sources 101a and 101b, a polygon mirror 108 reflecting a plurality of light beams respectively emitted by the light sources 101a and 101b, first cylinder lenses 104a and 104b and a second cylinder lens 107 that converges or directly transmits the light beams emitted from the light sources 101a and 101b. The first cylinder lenses 104a and 104b are disposed along proceeding paths of the light beams between the light sources 101a and 101b, and the polygon mirror 108. The LSU further comprises first reflecting mirrors 105a and 105b, and second reflecting mirrors 106a and 106b that project the light beams emitted by the light sources 101a and 101b onto the polygon mirror 108 with the same incidence angles by shifting proceeding paths of the emitted light beams. The first reflecting mirrors 105a and 105b and the second reflecting mirrors 106a and 106b are disposed between the first cylinder lenses 104a and 104b and the second cylinder lens 107. The LSU also further comprises an image focusing system 110 which respectively focuses an image corresponding to each light beam deflected from the polygon mirror onto the surface of a plurality of photoconductive drums 120, wherein the image is disposed between the polygon mirror 108 and the photoconductive drums 120. The LSU still further comprises a separator 109 that divides the light beams.

According to an embodiment of the present invention, the first cylinder lenses 104a and 104b, the second cylinder lens 107, the first reflecting mirrors 105a and 105b, and the second reflecting mirrors 106a and 106b comprise the incident optical system, whereas the separator 109 and the image focusing system 110 comprise the image optical system.

The multiple light sources 101a and 101b are semiconductor lasers, each having at least one light-emission point 111 or 111'. The light-emission points 111 and 111' are disposed linearly with a space in between along a sub-scanning direction. The multiple light sources 101a and 101b are disposed with a space in between in order to make a predetermined angle.

The polygon mirror 108 comprises a plurality of deflecting surface 108a, and revolves clockwise or counter-clockwise around an axis of rotation 108b (shown in FIG. 2) via a motor (not shown). The polygon mirror 108 reflects the light beams emitted by the light sources 101a and 101b.

The first cylinder lens 104a is disposed along proceeding paths of the light beams between the light source 101a and the first reflecting mirror 105a. The cylinder lens 104a has a cylindrical surface 104' on only one side thereof along the sub-scanning direction, as shown in FIG. 3. The cylinder lens 104a converges the light beams that pass through the cylindrical surface 104' along the sub-scanning direction, and directly transmits the light beams along a main scanning direction. Thus, the light beams that pass through the cylinder lens 104a converge onto a deflecting surface 108a of the polygon mirror 108 along the sub-scanning direction.

In addition, the first cylinder lens 104b is disposed along proceeding paths of the light beams between the light source 101b and the first reflecting mirror 105b. The cylinder lens 104b also has a cylindrical surface 104' on only one side thereof along the sub-scanning direction as shown in FIG. 3. The cylinder lens 104b converges the light beams that pass through the cylindrical surface 104' along the sub-scanning direction, and directly transmits the light beams along the main scanning direction. Thus, the light beams that pass through the cylinder lens 104b converge onto the deflecting surface 108a of the polygon mirror 108 along the sub-scanning direction.

The second cylinder lens 107 is disposed along proceeding paths of the light beams between the second reflecting mirrors 106a and 106b and the polygon mirror 108. Also, as shown in FIG. 4, the cylinder lens 107 has a cylindrical surface 107' on only one side thereof along the main scanning direction. The cylinder lens 107 converges the light beams that pass through the surface of cylinder 104' along the main scanning direction, and directly transmits the light beams along the sub-scanning directions.

The first cylinder lenses 104a and 104b are likely to have different focal distances due to the influence of heat generated when a printer motor operates. Therefore, the first cylinder lenses 104a and 104b are preferably made of a glass material, a focal distance of which does not change much with a temperature shift. The different embodiments of the present invention are not limited to the use of glass for first cylinder lenses 104a and 104b. Other materials can be used for the first cylinder lens 104a and 104b, as those skilled in the art can appreciate.

Furthermore, the cylinder lens 107 may be made of a plastic material since a focal distance thereof is not affected by the temperature shift. The second cylinder can be also made of a glass material.

The first cylinder lenses 104a and 104b are disposed between the light sources 101a and 101b and the polygon mirror 108, and comprises a finite optical system that converges the light beams emitted from the light sources 101a and 101b along the sub-scanning direction, and projects an image on the deflected surface of the polygon mirror 108. The first cylinder lenses 104a and 104b also further comprise an infinite optical system that directly transmits the light beams along the main scanning direction and projects the light beams onto the deflected surface 108a of the polygon mirror 108.

The first reflecting mirrors 105a and 105b shift proceeding paths of the light beams emitted from the multiple light sources 101a and 101b, toward the second reflecting mirrors 106a and 106b. The second reflecting mirrors 106a and 106b then re-shift the proceeding paths of the light beams, that are already shifted by the first reflecting mirror 105a and 105b, toward the polygon mirror 108. Thus, the second reflecting mirrors 106a and 106b accord the light beams emitted from the multiple light sources 101a and 101b, having different proceeding paths, and project the light beams on the deflected mirror 108a of the polygon mirror 108 with the same incidence angles.

If proceeding paths of the light beams emitted from the light sources 101a and 101b are accorded and the light beams are then projected onto the polygon mirror 108 with the same incidence angles, disposition of the first reflecting mirrors 105a and 105b, and the second reflecting mirrors 106a and 106b, can be changed in various ways.

The first reflecting mirrors 105a and 105b and the second reflecting mirrors 106a and 106b are preferably made of a flat mirror in order to change proceeding paths of the light beams.

Collimating lenses 102a and 102b, and aperture irises 103a and 103b are disposed between the light sources 101a and 101b and the polygon mirror 108. The collimating lenses 102a and 102b make the light beams emitted by the light sources 101a and 101b parallel or convergent.

The image focusing system 110 is disposed between the polygon mirror 108 and the photoconductive drums 120 and includes an f-lens that projects the light beams deflected from the polygon mirror 108 onto the photoconductive drums 120.

The following paragraphs will now discuss how the light beams emitted from the light sources in the laser scanning unit advances into the main and sub-scanning directions based on the attached drawings, in accordance with the embodiments of the present invention.

The multiple light beams emitted by the multiple light sources 101a and 101b become parallel after passing through the collimating lenses 102a and 102b and pass through the first cylinder lenses 104a and 104b along the main scanning direction indicated in FIG. 1, and converge in the sub-scanning direction as indicated in FIG. 2.

The light beams passed the first cylinder lenses 104a and 104b shift their proceeding paths after passing the first reflecting mirrors 105a and 105b and the second reflecting mirrors 106a and 106b. Because of the arrangement of first reflecting mirrors 105a, b and second reflecting mirrors 106a, b relative to each other, the light beams reflected from the second reflecting mirrors advances in a mutually uniform way.

The accorded light beams that passed through the second reflecting mirrors 106a and 106b are directly transmitted along the sub-scanning direction and converge along the main scanning direction, and are then projected onto the polygon mirror 108 after passing through the second cylinder lens 107. The light beam projected onto the polygon mirror 108 and then reflected, is divided into multiple light beams that are then projected onto the photoconductive drums 120 through the image focusing system 110.

As described above, the laser scanning unit of the present invention has the following advantages.

First, the laser scanning unit comprises an infinite optical system from the light sources to the polygon mirror in the direction of main scanning direction, and comprises a finite optical system in the direction of sub-scanning direction. Accordingly, degradation of the optical performance of the LSU can be minimized because there is little shift in a focal distance resulting from a temperature change.

Second, linearity errors can be substantially reduced or eliminated by using the plurality of reflecting mirrors disposed between the light sources and the polygon mirror, and by projecting the light beams onto the polygon mirror with the same incidence angles after shifting proceeding paths of the light beams.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A laser scanning unit comprising:
    at least one light source emitting at least one light beam;
    a polygon mirror that deflects the at least one light beam emitted by the at least one light source;
    an image focusing system that focuses an image corresponding to each light beam deflected from the polygon mirror onto the surface of a plurality of photoconductive drums; and
    an incident optical system disposed between the at least one light source and the polygon mirror, the incident optical system comprising a first cylinder lens and a second cylinder lens, wherein the first cylinder lens comprises an infinite optical system along a main scanning direction and a finite optical system along a sub-scanning direction and wherein the second cylinder lens comprises a finite optical system along a main scanning direction and an infinite optical system along a sub-scanning direction.

2. The laser scanning unit of claim 1, wherein the incident optical system further comprises:
    the first cylinder lens for converging the light beams along the sub-scanning direction and directly transmitting the light beams along the main scanning direction in terms of proceeding paths of said light beams; and
    the second cylinder lens for converging the light beams that pass through the first cylinder lens along into the main scanning direction and directly transmitting said beams along the sub-scanning direction.

3. The laser scanning unit of claim 2, wherein the first and second cylinder lens are made of a glass material.

4. The laser scanning unit of claim 2, wherein the first cylinder lens is made of a glass material and the second cylinder lens is made of a plastic material.

5. The laser scanning unit of claim 2, further comprising a plurality of reflecting mirrors that change proceeding paths of light beams to project the at least one light beam onto the polygon mirror with the same incidence angles.

6. The laser scanning unit of claim 5, wherein the reflecting mirrors are flat and reflection-coated.

7. The laser scanning unit of claim 1, wherein the light source has at least one light-emitting point.

8. The laser scanning unit of claim 1, further comprising a separator installed between the polygon mirror and the image focusing system, which separates the light beams deflected by the polygon mirror.

* * * * *